R. ZIEGENBERG.
ELECTRICITY METER.
APPLICATION FILED OCT. 3, 1914.
1,156,964.
Patented Oct. 19, 1915.
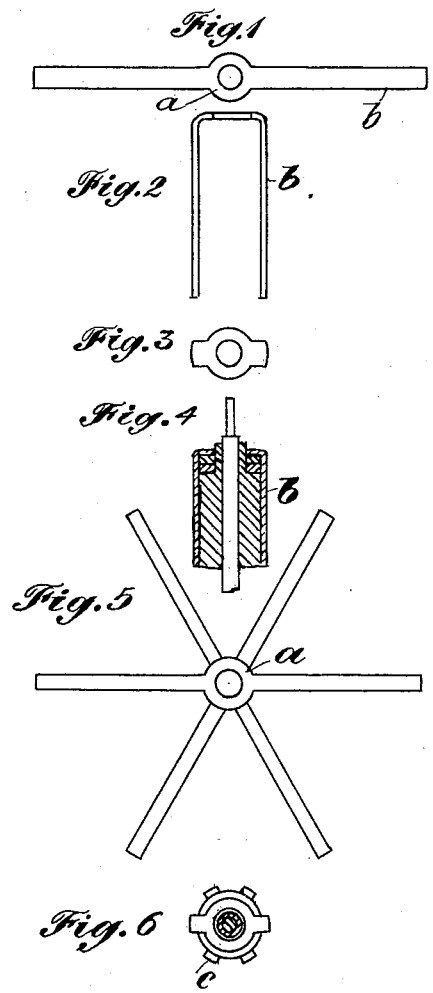

UNITED STATES PATENT OFFICE.

RUDOLF ZIEGENBERG, OF BERLIN-SCHOENEBERG, GERMANY, ASSIGNOR TO JOHANNES ELSTER, OF BERLIN, GERMANY.

ELECTRICITY-METER.

1,156,964.  Specification of Letters Patent.  Patented Oct. 19, 1915.

Original application filed April 16, 1913, Serial No. 761,603. Divided and this application filed October 3, 1914. Serial No. 864,776.

*To all whom it may concern:*

Be it known that I, RUDOLF ZIEGENBERG, a subject of the German Empire, residing at 20 Berchtesgadenerstrasse, Berlin-Schoeneberg, Germany, have invented certain new and useful Improvements in Electricity-Meters, of which the following is a specification.

In multiple pole direct current meters with commutators it is preferable, in order to make two brushes suffice, to connect the armature coils, which are subjected to the action of poles of like polarity. In this case, it is necessary to interconnect the commutator segments of like potential. This connection of the corresponding segments may be effected by special wires, these wires being connected, as by soldering, to the ends of the segments projecting beyond the upper or lower fastening rings. With the limited space available in a meter this arrangement is somewhat complicated and unreliable, besides increasing the cost of production of the meter.

The object of my invention is to provide a simple construction of commutator for multiple pole meters, affording also a more secure mechanical hold.

The present application is a division of my prior application Serial No. 761,603, filed April 16, 1913.

My invention is illustrated in the accompanying drawings, in which:—

Figure 1 is a plan view of a blank ready for forming up. Fig. 2 is a side view of the blank formed or bent into shape. Fig. 3 is a plan view of the same. Fig. 4 is a sectional view through the spindle and commutator. Fig. 5 is a plan view of similar blanks superposed upon each other before bending to form a complete commutator. Fig. 6 is a plan view of the said commutator with the blanks of Fig. 5 bent down into position.

Referring to the drawings, a six-part commutator constructed according to the invention is shown, which is adapted for a four-pole meter with a six-part armature. In the latter the two opposite armature coils are connected in series and consequently the opposite segments of the commutator are conductively connected with each other. This is effected according to the present invention by making the two respective segments of a simple strip which is originally straight, as shown in Fig. 1, and has a round opening in the center for the shaft. These strips are then bent together into the shape of a staple as shown in Figs. 2 and 3, Fig. 2 being a side view and Fig. 3 a plan. Each strip thus forms with its straight ends $b$ two segments, which are connected by the bridge $a$. These forked members are then thrust over the shaft, the latter having been previously covered with a thin insulating sleeve, and thin insulating plates are placed between the forked members. The three forks are arranged on the shaft so that each two adjacent arms are displaced from each other by an angle of 60 degrees, as indicated in Figs. 5 and 6. The superposition of the bridges of these forks, with the spindle passing through them, is clearly shown in Fig. 4. In this manner the construction of the commutator is simplified and it is more reliable and cheaper. It will be understood that in a commutator for more than four poles, for instance for a meter having six or eight poles, in which three or four segments have to be connected in parallel, the commutator would not be formed of originally straight strips as shown in Fig. 1, but of metal bodies having in the center a hole for the shaft, the center part having three or four radial strips according to the number of poles, said strips being arranged at equal distances apart. These strips are then bent together until parallel with each other as shown in Fig. 2.

What I claim is:—

In a commutator for a multiple pole direct current meter, the combination of a plurality of metal strips, each having a hole for the passage of a spindle, said strips being disposed so that the holes coincide with each other, and each strip forms a plurality of commutator segments.

In testimony whereof I affix my signature in presence of two witnesses.

RUDOLF ZIEGENBERG.

Witnesses:
  WOLDEMAR HAUPT,
  HEINRICH LUX.

Copies of this patent may be obtained for five cents each, by addressing the "Commissioner of Patents, Washington, D. C."